US010821555B2

(12) United States Patent
Böhme et al.

(10) Patent No.: US 10,821,555 B2
(45) Date of Patent: Nov. 3, 2020

(54) METHOD AND DEVICE FOR THE LASER-BASED WORKING OF TWO-DIMENSIONAL, CRYSTALLINE SUBSTRATES, IN PARTICULAR SEMICONDUCTOR SUBSTRATES

(71) Applicant: InnoLas Solutions GmbH, Krailling (DE)

(72) Inventors: Rico Böhme, Rochlitz (DE); Daniel Weber, Munich (DE)

(73) Assignee: InnoLas Solutions GmbH, Krailling (DE)

( * ) Notice: Subject to any disclaimer, the term of this patent is extended or adjusted under 35 U.S.C. 154(b) by 706 days.

(21) Appl. No.: 15/325,859

(22) PCT Filed: Jul. 7, 2015

(86) PCT No.: PCT/EP2015/065476
§ 371 (c)(1),
(2) Date: Jan. 12, 2017

(87) PCT Pub. No.: WO2016/008768
PCT Pub. Date: Jan. 21, 2016

(65) Prior Publication Data
US 2017/0157700 A1 Jun. 8, 2017

(30) Foreign Application Priority Data
Jul. 15, 2014 (DE) .................. 10 2014 213 775

(51) Int. Cl.
*B23K 26/53* (2014.01)
*B23K 26/06* (2014.01)
(Continued)

(52) U.S. Cl.
CPC ............ *B23K 26/53* (2015.10); *B23K 26/066* (2015.10); *B23K 26/0622* (2015.10);
(Continued)

(58) Field of Classification Search
CPC ............ B23K 26/0648; B23K 26/0652; B23K 26/066; B23K 26/53
See application file for complete search history.

(56) References Cited

U.S. PATENT DOCUMENTS 5,684,642 A * 11/1997 Zumoto ............... B23K 26/032
359/739
5,776,220 A * 7/1998 Allaire ............... B23K 26/0736
65/112
(Continued)

FOREIGN PATENT DOCUMENTS

DE 102011000768 A1 8/2012
EP 1338371 A1 8/2003
(Continued)

OTHER PUBLICATIONS

"German Application Serial No. 10 2014 213 775.6, Office Action dated Apr. 17, 2015", w/ English Translation, (dated Apr. 17, 2015), 18 pgs.
(Continued)

*Primary Examiner* — Atul P. Khare
(74) *Attorney, Agent, or Firm* — Schwegman Lundberg & Woessner, P.A.

(57) ABSTRACT

The present invention relates to a method for laser-based machining of a planar, crystalline substrate in order to separate the substrate into a plurality of parts, in which the laser beam of a laser is directed, for machining the substrate, onto the latter, in which, with an optical arrangement positioned in the beam path of the laser, a laser beam focal surface which is expanded, viewed both along the beam direction and viewed in precisely a first direction perpendicular to the beam direction, but is not expanded in a second direction which is both perpendicular to the first direction and to the beam direction, is formed from the laser beam radiated onto said arrangement on the beam output side of (Continued)

Figure 1:
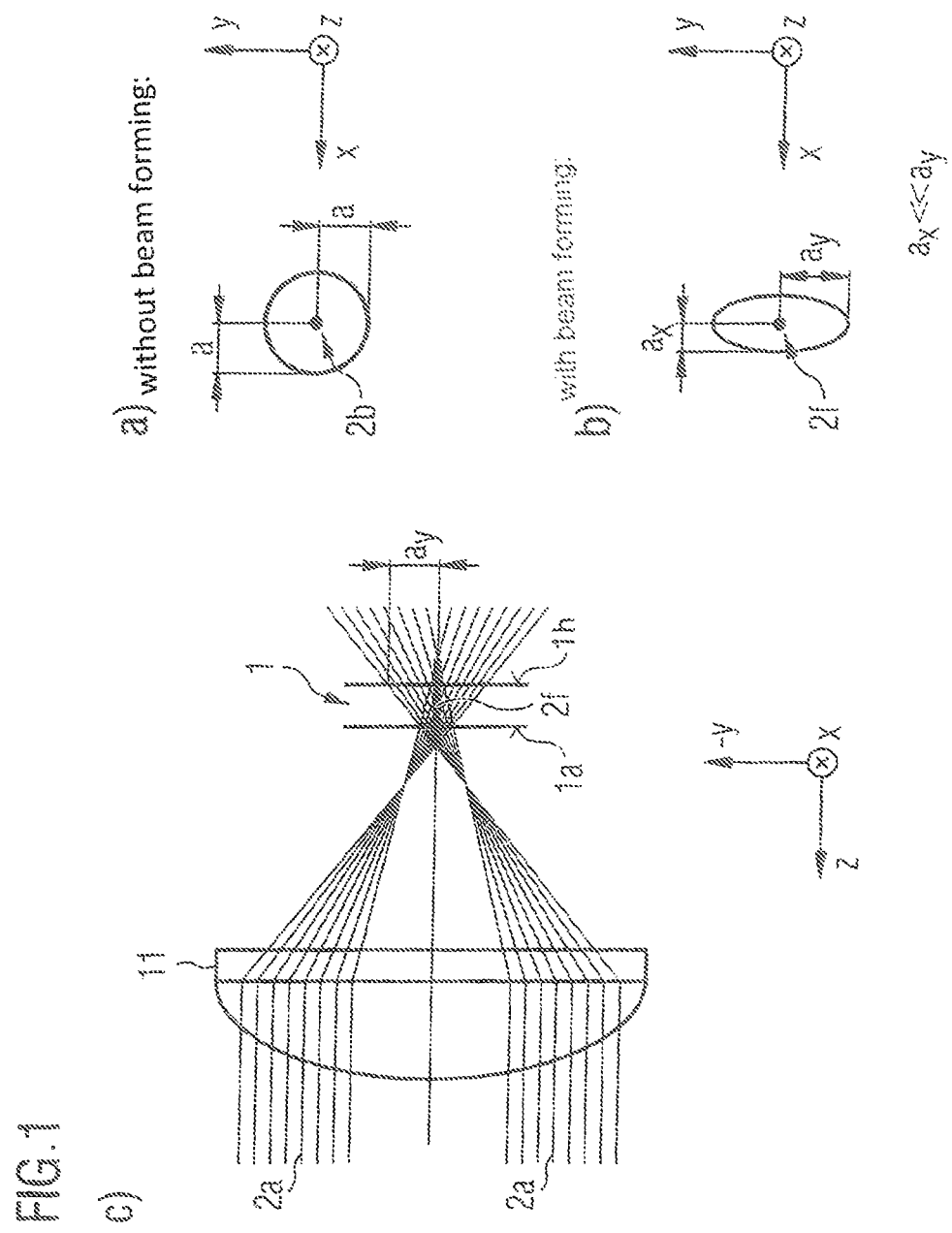

the optical arrangement, the substrate being positioned relative to the laser beam focal surface such that the laser beam focal surface in the interior of the substrate, along an expanded surface portion of the substrate material, produces an induced absorption by means of which crack formations in the substrate material induced along this expanded surface portion are effected.

11 Claims, 7 Drawing Sheets

(51) Int. Cl.
| | | |
|---|---|---|
| B23K 26/0622 | (2014.01) | |
| B23K 26/073 | (2006.01) | |
| B23K 26/066 | (2014.01) | |
| B23K 26/02 | (2014.01) | |
| B23K 101/40 | (2006.01) | |

(52) U.S. Cl.
CPC ...... *B23K 26/0648* (2013.01); *B23K 26/0652* (2013.01); *B23K 26/0732* (2013.01); *B23K 2101/40* (2018.08)

(56) References Cited

U.S. PATENT DOCUMENTS

| | | | |
|---|---|---|---|
| 6,472,295 B1 | 10/2002 | Morris et al. | |
| 6,992,026 B2* | 1/2006 | Fukuyo | B23K 26/03 438/797 |
| 2002/0046997 A1* | 4/2002 | Nam | B23K 26/0736 219/121.72 |
| 2002/0050489 A1 | 5/2002 | Ikegami et al. | |
| 2005/0024743 A1* | 2/2005 | Camy-Peyret | B23K 26/0617 359/719 |
| 2006/0109874 A1* | 5/2006 | Shiozaki | B23K 26/38 372/25 |
| 2010/0086741 A1* | 4/2010 | Bovatsek | B23K 26/0617 428/156 |
| 2013/0119031 A1 | 5/2013 | Matsuda et al. | |
| 2013/0327389 A1* | 12/2013 | Baird | B23K 26/0732 136/256 |
| 2013/0337633 A1* | 12/2013 | Seddon | H01L 21/78 438/462 |
| 2014/0199519 A1* | 7/2014 | Schillinger | B23K 26/0648 428/155 |
| 2015/0165562 A1* | 6/2015 | Marjanovic | C03B 33/0222 428/64.1 |
| 2015/0166396 A1* | 6/2015 | Marjanovic | B23K 26/384 428/137 |

FOREIGN PATENT DOCUMENTS

| | | | | |
|---|---|---|---|---|
| JP | 2000015467 A | * | 1/2000 | ......... B23K 26/146 |
| JP | 2009018344 A | * | 1/2009 | ......... B23K 26/0006 |
| WO | WO-2012091316 A2 | * | 7/2012 | ............ B23K 26/53 |

OTHER PUBLICATIONS

"International Application No. PCT/EP2015/065476, International Preliminary Examination Report dated Jul. 6, 2016", (dated Jul. 6, 2016), 6 pgs.

"International Application No. PCT/EP2015/065476, International Preliminary Report on Patentability dated Nov. 4, 2016", (dated Nov. 4, 2016), 54 pgs.

"International Application No. PCT/EP2015/065476, International Search Report dated Nov. 2, 2015", w/ English Translation, (dated Nov. 2, 2015), 4 pgs.

"International Application No. PCT/EP2015/065476, Written Opinion dated Nov. 2, 2015", (dated Nov. 2, 2015), 7 pgs.

\* cited by examiner

METHOD AND DEVICE FOR THE LASER-BASED WORKING OF TWO-DIMENSIONAL, CRYSTALLINE SUBSTRATES, IN PARTICULAR SEMICONDUCTOR SUBSTRATES

PRIORITY APPLICATIONS

This application is a U.S. National Stage Filing under 35 U.S.C. 371 from International Application No. PCT/EP2015/065476, filed on 7 Jul. 2015, and published as WO2016/008768 on 21 Jan. 2016, which claims the benefit of priority to German Application No. 10 2014 213 775.6, filed on 15 Jul. 2014; which applications and publication are incorporated herein by reference in their entirety.

The present invention relates to a method for laser-based machining of a planar, crystalline substrate in order to separate the substrate into a plurality of parts, and to a corresponding device and also to the use of such a method or of such a device. The aim thereby is in particular to separate planar substrates in the form of semiconductor wafers into a plurality of parts (isolation of the wafers). The process thereby takes place in general with pulsed lasers at a wavelength at which the materials of the substrate are essentially transparent.

Devices and methods for separating such materials by means of lasers are already known from the state of the art.

According to DE 10 2011 000 768 A1, lasers can be used, which are absorbed greatly by the material, by dint of their wavelength or their power, or make the material highly absorbent after the first interaction (heating with for example production of charge carriers; induced absorption), and then can ablate the material. This method has disadvantages in the case of many materials: e.g. impurities due to particle formation during ablation; cut edges can have microcracks because of the thermal input; cut edges can have melted edges; the cut gap is not uniform over the thickness of the material (has different widths at different depths; e.g. wedge-shaped cut notch). Since material must be vaporised or liquefied, a high average laser power must be provided.

U.S. Pat. No. 6,472,295 B1 shows a method and a device for laser cutting of a target material. The method comprises the steps of producing laser pulses from a laser system and using the laser pulses on the target material so that the laser pulses cut through the material. The laser pulses produce an approximately ellipsoidal spot, have a temporal pulse shorter than approximately 100 nanoseconds and have an energy density of approximately 2 to approximately 20 times the removal threshold energy of the target material.

In addition, US 2013/327389 A1 describes a method comprising a layer structure for a photovoltaic device. The layer structure comprises an electrode, a light absorber, comprising a layer of chalcopyvrite semiconductor material, such as for example copper-indium-gallium diselenide, disposed on the electrode, and a transparent electrode.

US 2013/119031 A1 describes a method for production from a material layer on a substrate, without producing cracks in the material layer. Pulsed laser light is thereby used.

US 2002/050489 A1 describes: in a laser beam machining method, a fluid, by means of which a laser beam can be transmitted, is used. The laser beam is guided onto the target surface by the fluid.

Furthermore, there are methods in which a laser is used, at the wavelength of which the material is extensively transparent so that a focal point can be produced in the interior of the material. The intensity of the laser must be high enough that, at this internal focal point in the material of the irradiated substrate, internal damage takes place.

The last-mentioned methods have the disadvantage that the induced crack formation takes place at points at a specific depth, or at the surface, hence the entire thickness of the material is separated only via an additional, mechanically and/or thermally induced crack propagation. Since cracks tend to propagate non-uniformly, the separation surface is generally of high roughness and often must be re-machined. In addition, the same process must be applied multiple times at different depths. This in turn prolongs the process speed by the corresponding multiple.

Starting from the state of the art, it is therefore the object of the present invention to make available a method (and also a corresponding device) with which planar, crystalline substrates, in particular made of semiconductor materials, can be machined, in particular completely separated, without particle formation, without melted edges, with minimal crack formation at the edge, without noticeable cut gaps (i.e. material losses), with as straight as possible cut edges and at high process speed.

Subsequently, the present invention is firstly described in general, then in detail with reference to various embodiments. The features shown in the individual embodiments, in combination with each other, need not thereby all be produced within the scope of the invention. In particular, individual features can also be omitted or combined in a different way with other shown features of the same embodiment or also of other embodiments.

Also individual features of one embodiment can in fact demonstrate per se advantageous developments of the state of the art.

Subsequently, firstly the basis of the present invention (mechanism of separation of the substrate into individual parts according to the invention) is described.

The method for separation according to the invention produces, per laser pulse, a laser beam focal surface (in contrast to a focal point) by means of a laser lens system suitable for this purpose (subsequently also termed optical arrangement). The focal surface defines the zone of interaction between laser and material of the substrate. If the focal surface falls in the material to be separated, the laser parameters can be chosen such that an interaction with the material takes place, which produces according to the invention crack zones along the focal surface (i.e. distributed over this surface). Important laser parameters here are the wavelength of the laser and the pulse duration of the laser.

For the interaction of the laser light with the material according to the invention, the following should preferably be present:

1) The wavelength of the laser is preferably chosen such that the material is essentially transparent at this wavelength (in concrete terms, e.g.: absorption $\ll 10\%$ per mm of material depth $\Rightarrow \gamma \ll 1/cm$; $\gamma$: Lambert-Beer absorption coefficient).

2) The pulse duration of the laser is preferably chosen such that, within the interaction time, no substantial heat transport (heat diffusion) out of the interaction zone can take place (in concrete terms e.g.: $\tau \ll F/\alpha$, F: size of the laser beam focal surface, $\tau$ laser pulse duration, $\alpha$: heat diffusion constant of the material).

3) The pulse energy of the laser is preferably chosen such that the intensity in the interaction zone, i.e. in the focal surface, produces an induced absorption which leads to local heating of the material over the focal surface, which in turn leads to crack formations over the focal surface as a consequence of the thermal stress introduced into the material.

4) Furthermore, the intensity over the pulse duration, the pulse energy and the expansion or size of the laser beam focal surface should be chosen such that no ablation or melting, but only crack formations in the structure of the solid body, are effected. This requirement is easiest to fulfil for typical materials, such as semiconductors or transparent crystals, with pulsed lasers in the sub-nanosecond range, in particular therefore with pulse durations of e.g. between 10 and 100 ps.

Subsequently, the production of the geometry of a desired separation surface (relative movement between laser beam and substrate along a line on the substrate surface) is described.

The interaction according to the invention with the material produces, per laser pulse, an individual crack zone region in the material (viewed in the direction perpendicular to the substrate surface and in the feed direction of the laser beam) over a focal surface. For complete separation of the material, a sequence of such crack zone regions is positioned, per laser pulse, so tightly adjacently along the desired separation line that a lateral connection of the crack zone regions forming a desired crack surface/contour in the material is produced. For this purpose, the laser is pulsed at a specific sequence frequency.

For production of the desired separation surface in the material, either the pulsed laser light can be moved over the stationary material with an optical arrangement which is moveable parallel to the substrate plane (and possibly also perpendicular thereto), or the material itself is moved with a moveable receiving means past the stationary optical arrangement such that the desired separation line is formed.

Finally, also the last step of separation of the substrate into the plurality of parts (separation or isolation in the narrower sense) is effected.

The separation of the material along the produced crack surface/contour is thereby effected either by intrinsic stress of the material or by introduced forces, e.g. mechanically (tension) or thermally (non-uniform heating/cooling). Since no material is ablated according to the invention, at first generally there is no continuous gap in the material, but only a highly disrupted breakage area (microcracks) which is interlocked, per se, and possibly still connected by bridges. As a result of the subsequently introduced forces, the remaining bridges are separated via lateral crack growth (effected parallel to the substrate plane) and the interlocking is overcome so that the material can be separated along the separation surface.

Subsequently, the essential features of a method according to the invention and also of a device according to the invention are described with reference to the patent claims.

The laser beam focal surface described in the abovementioned claims, produced by means of the optical arrangements is termed, previously and subsequently, alternatively simplified also as focal surface of the laser beam. According to the invention, the substrate is separated or isolated into the plurality of parts by the crack formation according to the invention (induced absorption over the expanded focal surface which extends into the substrate perpendicular to the substrate plane) viewed in the substrate plane. The crack formation according to the invention is hence effected into the substrate or into the interior of the substrate perpendicular to the substrate plane. As described already, in general a large number of individual laser beam focal surface portions must be introduced into the substrate along a line on the substrate surface in order that the individual parts of the substrate can be separated from each other. For this purpose, either the substrate can be moved parallel to the substrate plane relative to the laser beam or to the optical arrangement or conversely the optical arrangement can be moved parallel to the substrate plane relative to the substrate which is disposed in a stationary manner.

Advantageously, in addition the features of at least one of the dependent method- or device claims are produced according to the invention. Also the features of several dependent claims can be produced thereby in any combination.

There is understood by the term surface (i.e. laser beam focal surface), in the mathematical sense, a structure extended endlessly in two dimensions. The expansion of the laser beam focal surface in both mentioned dimensions (to an approximation) can be defined by the full width at half maximum. According to the invention, the expansion of the laser beam focal surface in the direction perpendicular to the mentioned two dimensions is very much smaller than in the mentioned two dimensions, preferably by at least 10 times, 50 times, 100 times or even 500 times smaller. The term "along the surface portion" thereby means the same as "viewed over the entire surface of this portion". There is understood by induced absorption, a process which leads to the formation of microstructure defects in the crystal structure of the substrate. The microstructure defects then define parts of a weakened surface, along which or via which separation of the substrate into the plurality of parts is effected. It is thereby assumed (without restricting the generality) that by means of the local absorption of energy in the laser beam focal surface region, amorphousness is caused, by means of which the substrate material expands. The expansions lead to pressure stresses, as a result of which local cracks in or over the expanded surface portion of induced absorption occur.

Advantageously achievable features can include a semiconductor substrate, preferably a GaAs substrate, or an elementary semiconductor substrate, preferably an Si substrate. The insulator substrate can be in particular an oxide, preferably $Al_2O_3$ (sapphire) or $SiO_2$ (quartz), or a fluoride, preferably $CaF_2$ or $MgF_2$, or a chloride, preferably NaCl, or a nitride, preferably $Si_3N_4$ or BN. The substrate comprising or consisting of at least one carbon-based material with crystalline or quasi-crystalline basic order can in particular comprise or consist of carbon nanotubes.

Further advantageously achievable features are described by the present disclosure. The expansion of the laser beam focal surface in the respective spatial direction can thereby be defined by that stretch over which the intensity in the laser beam is at least half as great as the maximum intensity achieved in the laser beam. The expansion of the laser beam focal surface, subsequently termed length l, can be configured to be larger by at least 10 times than the expansion D of the laser beam focal surface in the second direction. The length of the laser beam focal surface in beam direction can preferably be configured to be larger, preferably by at least 20 times, preferably by at least 50 times, preferably by at least 100 times, preferably by at least 500 times, than the expansion D of the laser beam focal surface in the second direction. The width of the laser beam focal surface in the first direction can preferably be configured to be larger by at least 10 times, preferably by at least 50 times, preferably by at least 100 times, than the expansion D of the laser beam focal surface in the second direction.

In an example, the expanded surface portion of the induced absorption in the interior of the substrate extends from a surface of the substrate as far as a defined depth in the substrate (or even beyond that). The expanded portion of the induced absorption can thereby comprise the entire substrate depth from one surface to the other. It is also possible to produce longitudinally expanded portions of the induced absorption merely in the interior of the substrate (without the surfaces of the substrate also being included).

Figure 3:
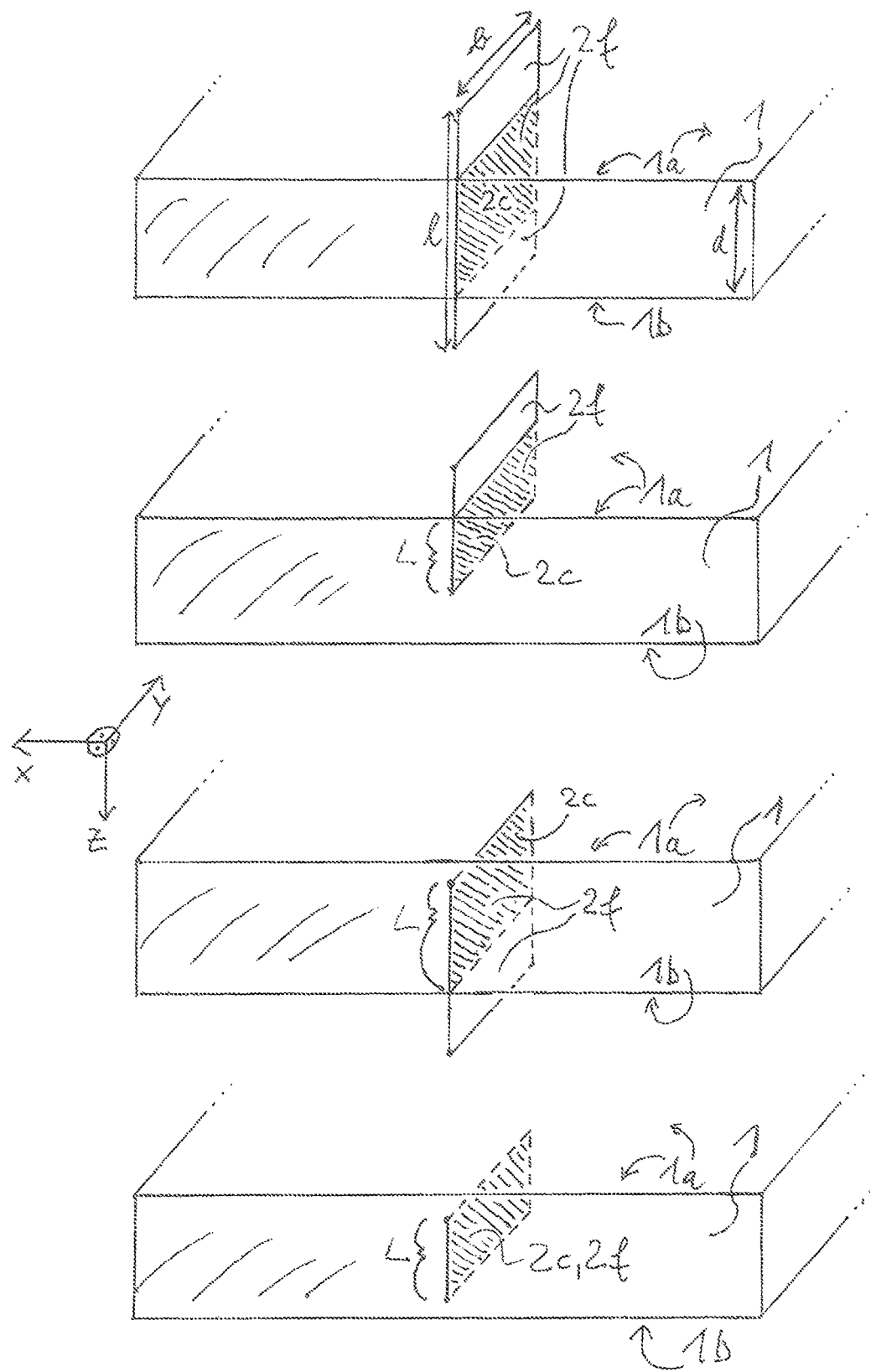

Further advantageously achievable features can be deduced from FIG. 3 and the corresponding descriptive text. The substrate can be positioned relative to the laser beam focal surface such that, viewed in beam direction, the expanded surface portion of the induced absorption in the material, i.e. in the interior of the substrate, extends from one of the two oppositely situated substrate surfaces, up to another of the two oppositely situated substrate surfaces, i.e. over the entire layer thickness d of the substrate. The expanded surface portion of the induced absorption in the material, i.e. in the interior of the substrate, can extend, viewed in beam direction, starting from one of the two oppositely situated substrate surfaces, into the substrate over 80% to 98%, preferably over 85% to 95%, particularly preferably over 90%, of the entire layer thickness d. The expanded surface portion of the induced absorption (i.e. for example crack lengths introduced perpendicular to the substrate plane) can hence extend both from a specific depth in the interior of the substrate up to the rear-side surface of the substrate or even for example from the front-side surface of the substrate up to a specific depth in the interior of the substrate. The layer thickness d is thereby measured respectively perpendicular to the two oppositely situated substrate surfaces of the planar substrate.

In the case of all range limits mentioned or described in the present disclosure, the mentioned range limits include respectively the indicated upper and lower boundary value.

In an example, the induced absorption is produced as described herein. This takes place by means of adjustment of the already described laser parameters, explained subsequently also within the scope of examples, of the parameters of the optical arrangement and also of the geometric parameters of the arrangement of the individual elements of the device according to the present approach. Basically, any feature combination of parameters, as are mentioned is thereby possible. $\tau \ll F/a$ thereby means (see also subsequently) that $\tau$ is less than 1%, preferably less than 1% of F/a (F is thereby the planar expansion of the laser beam focal surface). For example, the pulse duration $\tau$ can be at 10 ps (or even below that), between 10 and 100 ps or even over 100 ps. For separation of Si substrates, preferably an Er:YAG laser is used with a wavelength between 1.5 and 1.8 µm. In general, preferably a laser is used for semiconductor substrates, with a wavelength which is chosen such that the photon energy is less than the band gap of the semiconductor.

The length l of the laser beam focal surface can be between 0.2 mm and 10 mm. The width b of the laser beam focal surface can be between 0.02 mm and 2.5 mm. The layer thickness d of the substrate, measured perpendicular to the two oppositely situated substrate surfaces, can be between 2 µm and 3,000 µm. The ratio V1=l/d of the length l of the laser beam focal surface and the layer thickness d of the substrate can be between 10 and 0.5. The expansion D of the laser beam focal surface in the second direction can be between 1 µm and 50 µm.

The following is preferred: The length l of the laser beam focal surface can thereby be between 0.5 mm and 2 mm and/or the width b of the laser beam focal surface can be between 0.05 mm and 0.2 mm and/or the layer thickness d of the substrate, measured perpendicular to the two oppositely situated substrate surfaces, can be between 100 µm and 500 µm and/or the ratio V1=l/d of the length l of the laser beam focal surface and the layer thickness d of the substrate can be between 5 and 2 and/or the expansion D of the laser beam focal surface in the second direction can be between 5 µm and 25 µm The pulse duration $\tau$ of the laser is chosen such that, within the interaction time with the material of the substrate (1), the heat diffusion in this material is negligible, preferably no heat diffusion being effected, for which purpose preferably $\tau$. F as surface expansion of the laser beam focal surface and the heat diffusion constant a of the material of the substrate are adjusted according to $\tau \ll F/a$ and/or preferably $\tau$ is chosen to be less than 10 ns, preferably less than 100 ps. The pulse repetition frequency of the laser can be 100 kHz. The average laser power can be between 15 watts and 30 watts. The laser, in particular for crystals which are transparent in the visible wavelength range as substrate, can be an Nd:YAG laser with a wavelength $\lambda$ of 1.064 nm or a Y:YAG laser with a wavelength $\lambda$ of 1,030 nm. Or the laser, in particular for semiconductor substrates which are transparent in the infrared wavelength range, can be an Er:YAG laser with a wavelength $\lambda$ between 1.5 µm and 2.1 µm.

The wavelength $\lambda$ of the laser can be chosen such that the material of the substrate is transparent at this wavelength or is substantially transparent, there being understood by the latter that the intensity reduction of the laser beam, effected along the beam direction, in the material of the substrate is, per millimetre of penetration depth, 10% or less.

The possibly still necessary additional method steps for the final separation or isolation of the substrate into the plurality of parts thereof are described.

The laser beam can be moved relative to the surface of the substrate along a line parallel to the first direction, along which the substrate is to be separated to produce the plurality of parts, along this line a large number of expanded surface portions of induced absorption being produced in the interior of the substrate. Preferably the ratio V2=A/b of the average spacing A of directly adjacent, i.e. directly successively produced, expanded surface portions of induced absorption and the width b of the laser beam focal surface in the first direction is between 1.0 and 1.3, preferably between 1.0 and 1.1.

As already mentioned, either the substrate is moved relative to the optical arrangement (including laser) or the optical arrangement (including laser) is moved relative to the substrate. There is thereby understood by the spacing A, not the spacing between the two directly oppositely situated (viewed in beam direction z, i.e. into the substrate) limits of two immediately adjacent (i.e. produced by temporally successive laser pulses) surface portions of induced absorption, but rather the spacing between one and the same limit (for example the limit situated at the front, viewed in the movement direction of the laser along the desired separation line) of two immediately adjacent surface portions of induced absorption. The aim is therefore to string together, as far as possible without overlapping of the individual induced absorptions produced in the interior of the substrate (otherwise too great differences in the microstructure defects in the crystal structure along the desired separation line would occur because of approximately doubled absorbed intensities in the overlapping region) and with as small as possible gaps therebetween, adjacent surface portions of induced absorption along the desired separation line. A non-induced crack formation should be understood (in contrast to the induced crack formation essential according to the present disclosure) as transverse crack, i.e. as a lateral crack formation in a direction situated in the plane of the substrate (corresponding to the course of the line along which the substrate is intended to be separated).

Advantageous embodiments of devices, are as follows (see in this respect the subsequent embodiments or FIGS. 4 to 7).

A device according to the invention can thereby comprise both the optical arrangement and the substrate to be positioned relative thereto.

In an example, between an optical element with a non-spherical free surface and a diaphragm, an optical element collimating the laser beam can be positioned and orientated such that the laser radiation emanating from the optical element with the non-spherical free surface is projected parallel onto the diaphragm.

The optical arrangement can comprise, on the beam output side of the diaphragm or of the optical element which focuses the laser beam in the first direction, but not in the second direction, an optical element which focuses the laser beam at least in the first direction.

The diaphragm orientated with a preferential direction in the first direction can be a slit diaphragm orientated in the first direction. The optical element collimating the laser beam can be a plano-convex collimation lens. The optical element which is disposed on the beam output side of the optical element with the non-spherical free surface and also at a spacing z2 therefrom and focuses the laser beam in the first direction, but not in the second direction, can be a cylindrical lens orientated parallel to the second direction. The optical element which is disposed, in the optical arrangement, on the beam output side of the diaphragm or of the optical element which focuses the laser beam in the first direction but not in the second direction, and which focuses the laser beam at least in the first direction can be a collimation lens, preferably a plano-convex collimation lens, which focuses the laser beam in the first and in the second direction. The optical element which is disposed on the beam output side of the double wedge and focuses the laser beam at least in the first direction can be a collimation lens, preferably a plano-convex collimation lens, which focuses the laser beam in the first and in the second direction.

Instead of a diaphragm, an aperture can also be used or the diaphragm can be formed as an aperture. It is also possible, instead of the diaphragm, to use a diffractive element (with defined edge intensities) or to form the diaphragm as a diffractive element (with defined edge intensities.) (In addition to normal diaphragms, also diffractive beam formers can be combined to produce a line focus with the axicon).

In an example, deflection of the two beam bundles means that the two beam bundles, viewed per se, are deflectable respectively parallel and, viewed in their entirety, are directed towards each other.

Essential uses according the disclosure may include: separation of a semiconductor substrate, in particular of a 4-6 or 3-5 semiconductor substrate, preferably of a GaAs substrate, or of an elementary semiconductor substrate, preferably of an Si substrate, separation of an insulator substrate, in particular of an oxide, preferably of Al2O3 (sapphire) or of SiO2 (quartz), or of a fluoride, preferably of CaF2 or of MgF2, or of a chloride, preferably of NaCl, or of a nitride, preferably of Si3N4 or of BN, or separation of a substrate comprising or consisting of at least one carbon-based material with crystalline or quasi-crystalline basic order, in particular comprising or consisting of carbon nanotubes.

The present invention, in comparison with methods or devices known from the state of the art, has a series of essential advantages.

Firstly, the cut formation is effected, according to the invention, without particle formation, without melted edges, with minimal crack formation at the edge, without a noticeable cut gap (hence without loss of material of the substrate) and with straight cut edges.

According to the invention, a very high average laser power is unnecessary, nevertheless comparably high separation rates can be achieved. It is thereby essential that the invention produces, per laser pulse (or per burst pulse), a laser beam focal surface (and not merely a focal point which is not expanded or only very locally). For this purpose, the laser lens systems also illustrated in detail subsequently are used. The focal surface thus defines the zone of interaction between laser and substrate. If the focal surface falls at least in portions (viewed in the depth direction) into the substrate material to be separated, the laser parameters can be chosen such that an interaction with the material takes place, which produces, according to the invention, crack zones along the entire focal surface depth and over the entire focal surface width. Selectable laser parameters are for example the wavelength of the laser, the pulse duration of the laser and the pulse energy of the laser.

Further advantages which the method according to the invention possesses relative to for example mechanical cracking and breaking are that, in addition to the lack of (or at least minimal) particle formation, in contrast to a mechanical crack line, a high aspect ratio (ratio of the expansion of the laser beam focal surface in the depth direction to the expansion in the second direction) can be achieved. Whilst during mechanical cracking and breaking, the breakline is produced into the material via extensively uncontrollable crack growth, separation can be effected according to the invention at a very precisely adjustable angle relative to the substrate normal. According to the invention, also diagonal cuts are readily possible.

Also a high machining speed is possible even with fairly thick substrates.

Ablation on the surface, burr formations on the surface and particle formations are avoided (the latter in particular if the position of the focal surface is adjusted relative to the substrate such that the method according to the invention, starting from the surface of the substrate into the interior of the substrate, ensures the expanded induced absorption and crack formations according to the invention). In this case, the first (desired) damage takes place directly at the surface and continues in a defined manner along the crack formation zone by means of induced absorption into the substrate depth.

According to the invention, different materials, in particular sapphire wafers, semiconductor wafers . . . can be machined.

Also already coated materials (e.g. coated with TCO) or also printed substrates which are not transparent on one side can be machined and separated according to the invention.

According to the invention, cutting is possible in practice without a cut gap: merely material damage is produced which is generally in the range between 1 and 10 μm of expansion. In particular, no cut loss is thereby generated with respect to material or surface. This is advantageous in particular during cutting of semiconductor wafers since cut gap losses would reduce the actively usable surface of the wafer. Due to the method according to the invention of focal surface cutting, an increased surface yield is hence produced.

The method according to the invention can be used in particular also in inline operation of production processes. In a particularly advantageous manner, this takes place during production processes which take place in a roll-to-roll process.

According to the invention, individual pulse lasers can also be used, such as lasers which generate burst pulses. Basically, also the use of lasers in continuous line operation is possible.

The following specific application fields arise, by way of example:
1. Separation of sapphire LED with the possibility of cutting the sapphire wafer entirely or partially. With the method according to the invention, the metal layer can thereby likewise be jointly separated, and in a single step.
2. Isolation of semiconductor wafers is possible without damaging the tape. For this purpose, the focal surface is only placed partially in the interior of the substrate material so that it begins at the surface and stops before the taped film (on the rear-side surface of the substrate orientated away from the laser): for example, approx 10% of the material is not separated. The film hence remains intact because the focal surface "stops" before the film. The semiconductor wafer can then be subsequently separated via mechanical forces (or thermal forces, e.g. by means of $CO_2$ lasers) over the remaining 10%.
3. Cutting of coated materials: examples here are Bragg reflectors (DBR) or also metal-coated sapphire wafers. Also processed silicon wafers on which the active metal- or metal oxide layers have already been applied, can be cut according to the invention.

Figure 2:
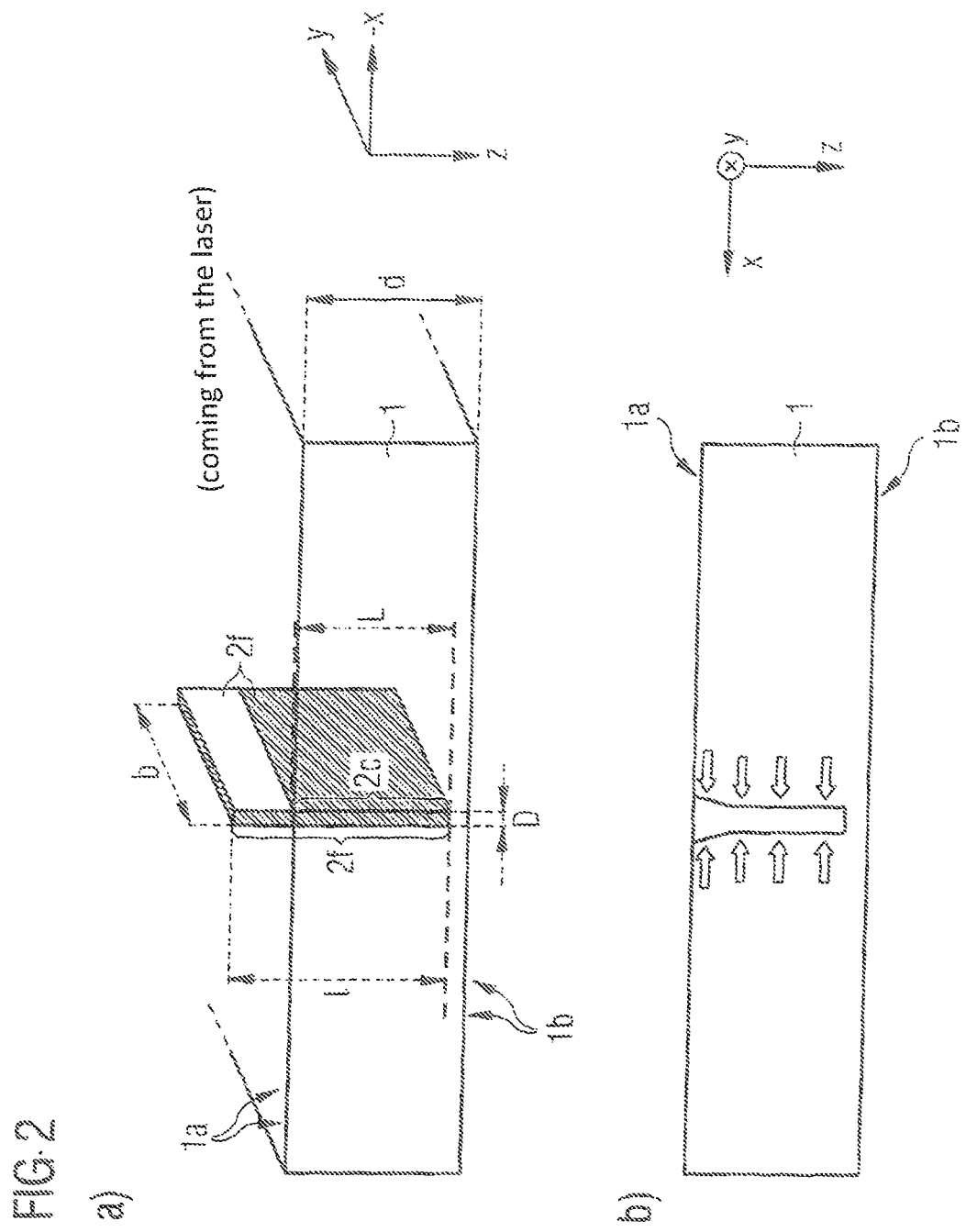
Figure 4:
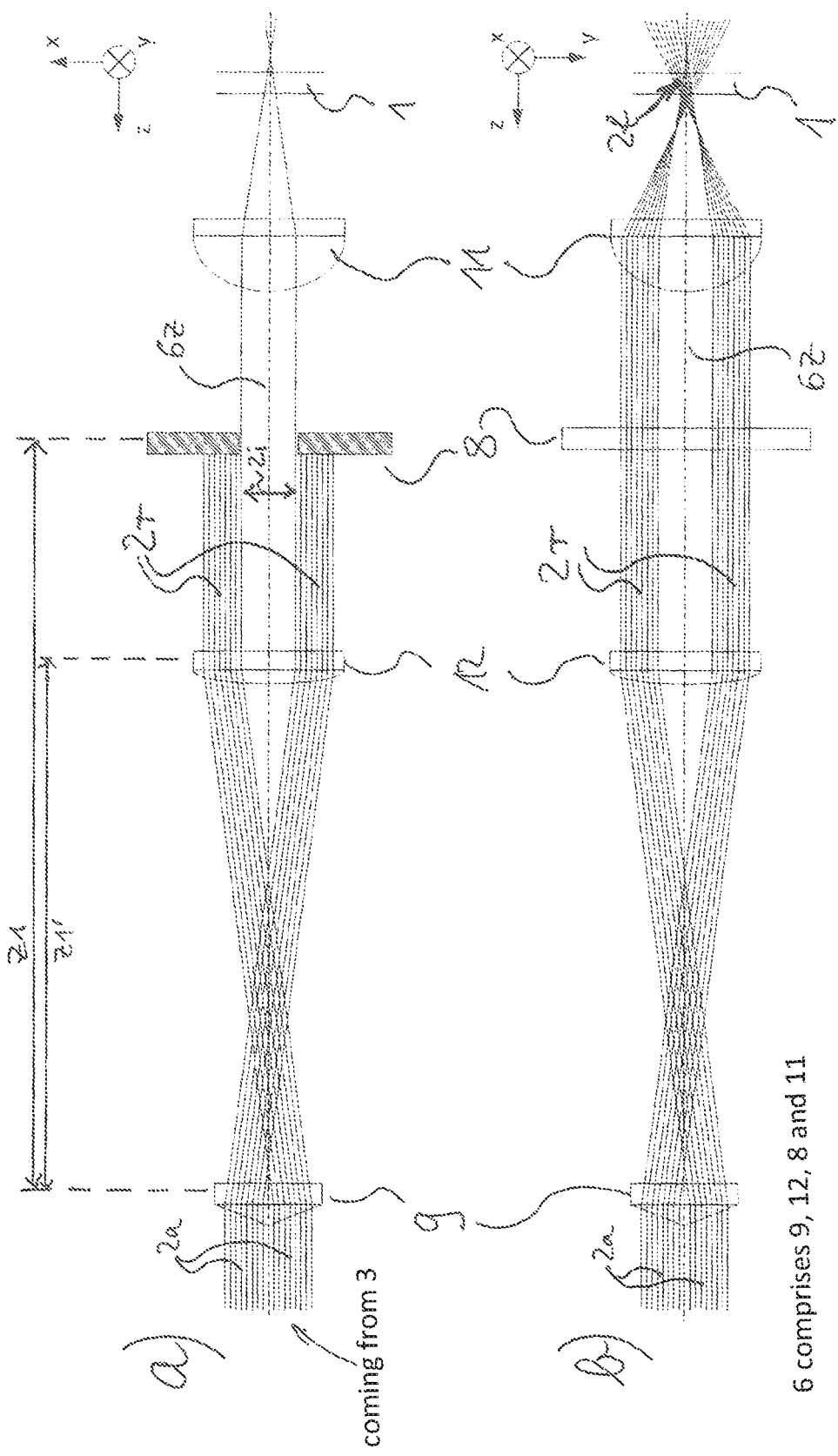
Figure 5:
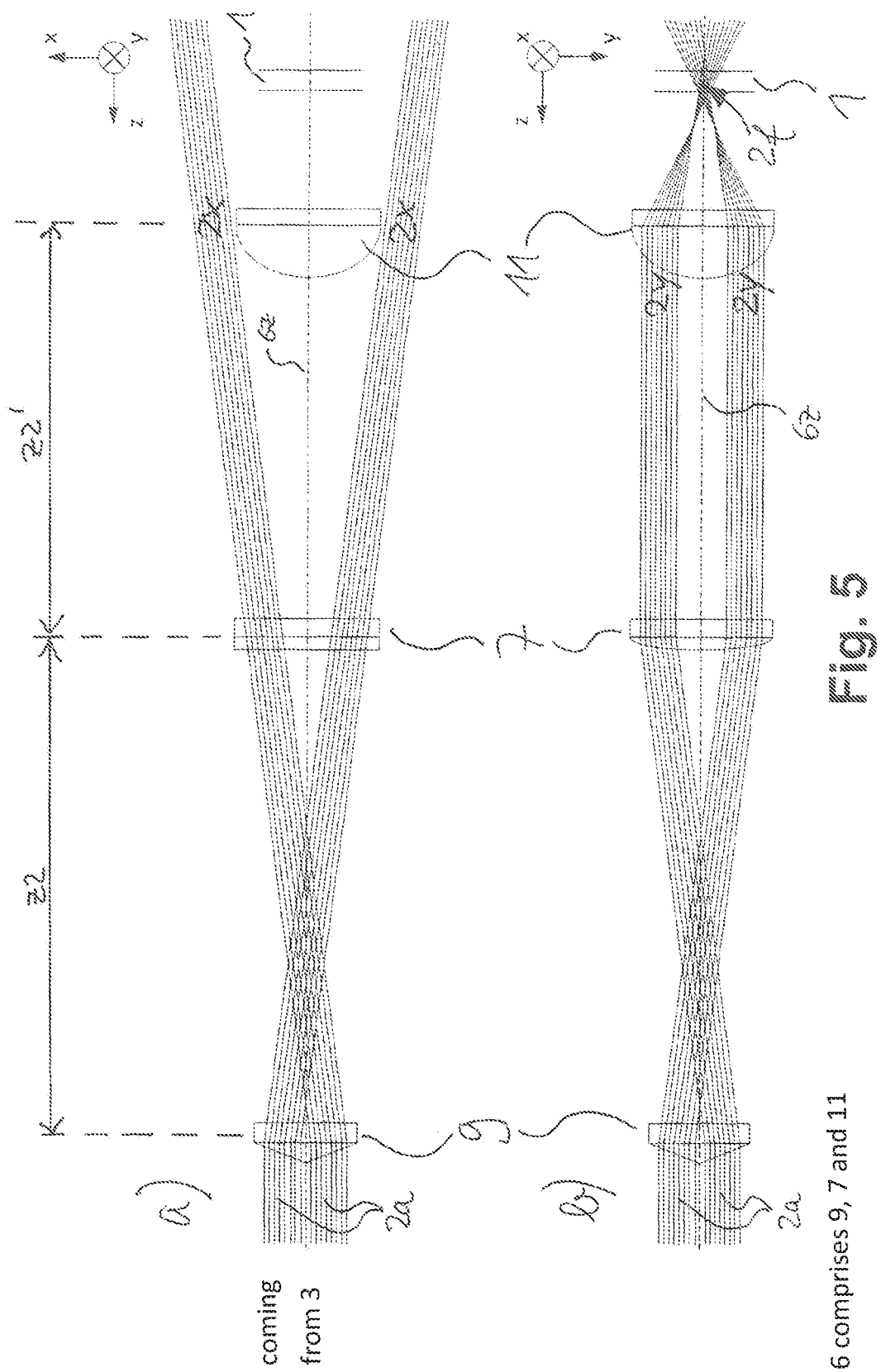
Figure 6:
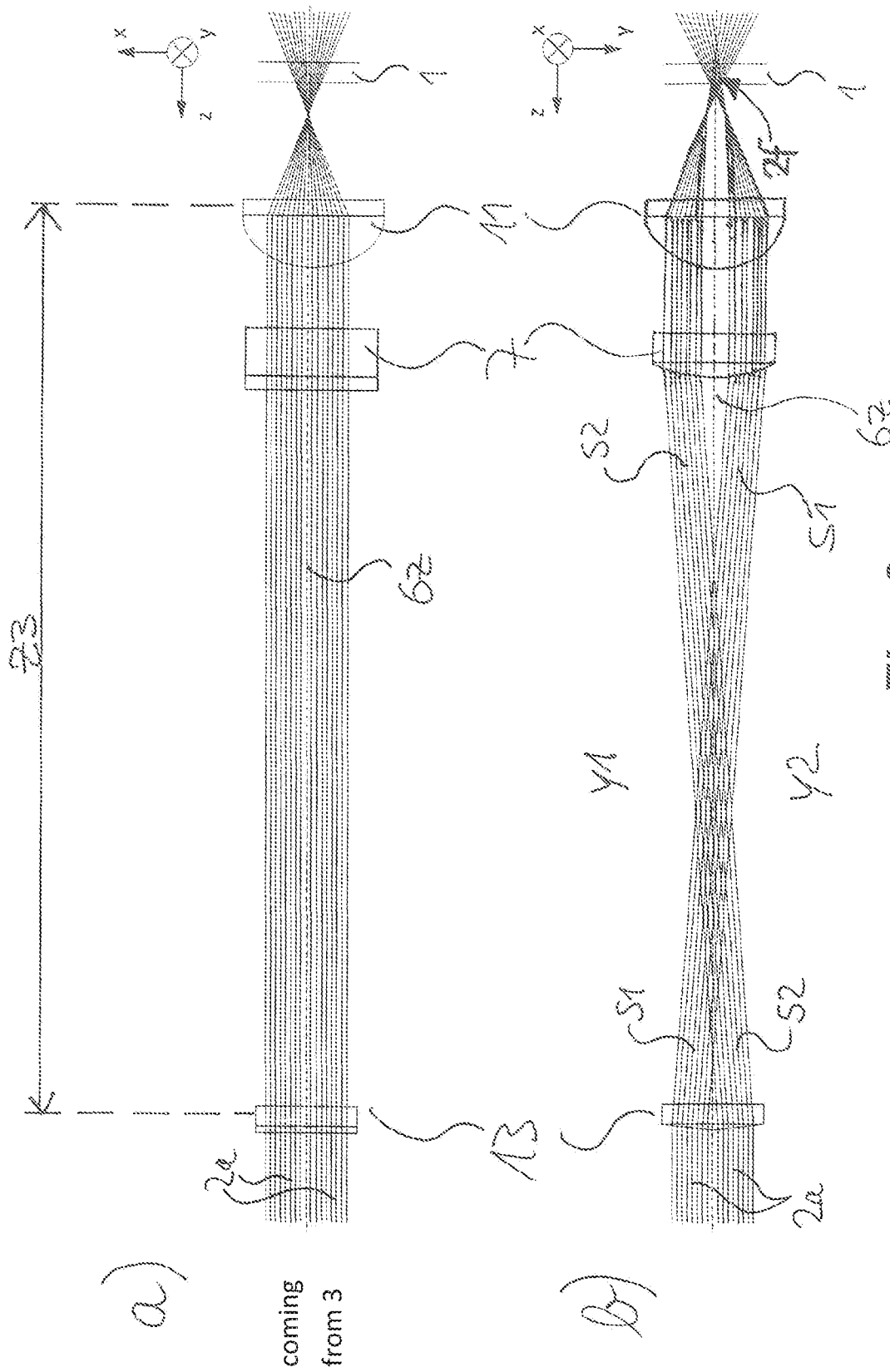
Figure 7:
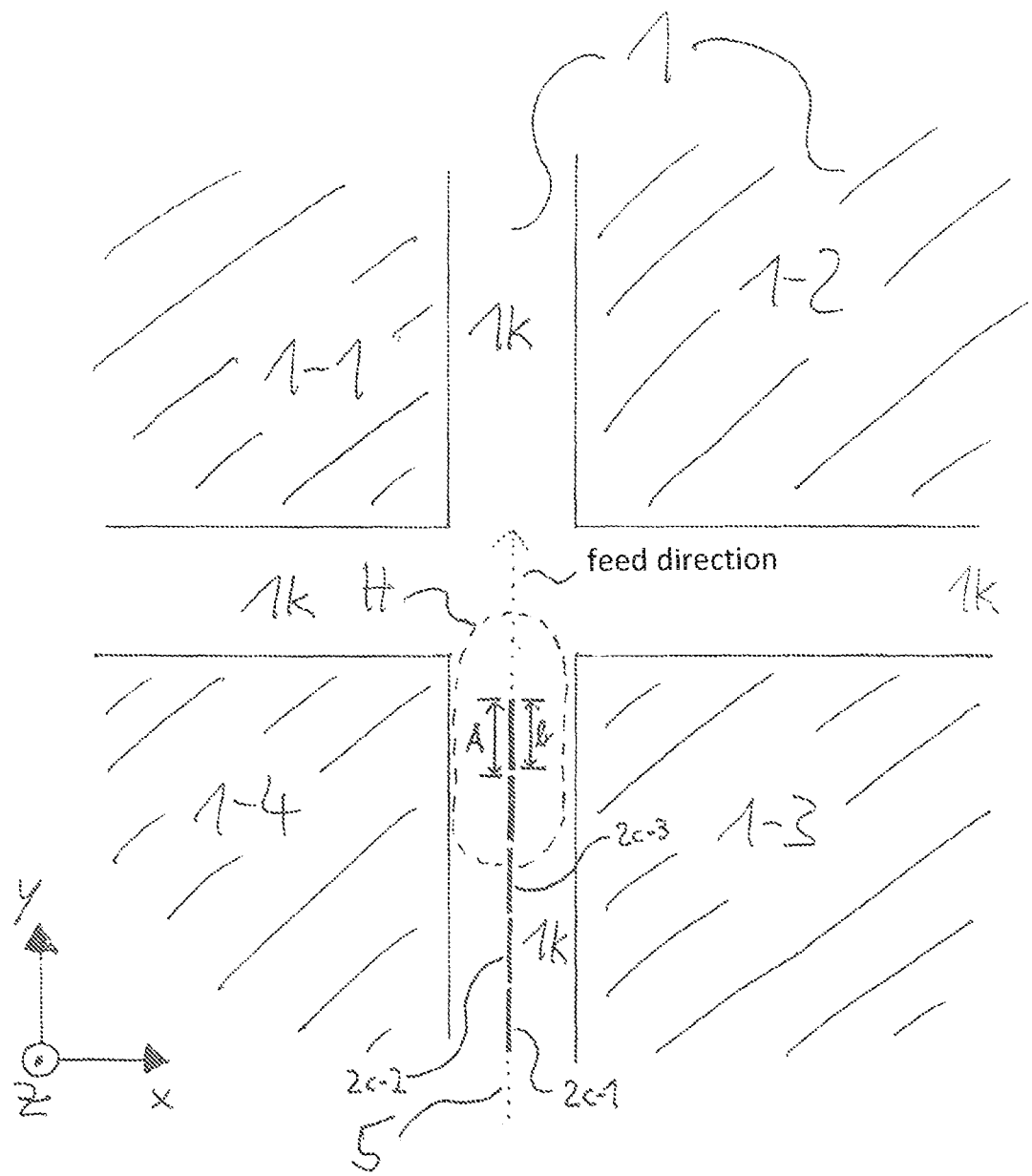

Subsequently, the present invention is now described with reference to some of the embodiments based on what was described above. There are thereby shown:

FIG. 1 the principle of the production according to the invention of a laser beam focal surface with which the machining according to the invention of a substrate material which is transparent at the laser wavelength (here: silicon substrate) can be effected because of the induced absorption in the region of the laser beam focal surface, FIG. 2 the positioning according to the invention of the laser beam focal surface in the substrate in detail, FIG. 3 different possibilities for machining the substrate by different positioning of the laser beam focal surface relative to the substrate, FIG. 4 a first optical arrangement which can be used according to the invention, FIG. 5 a second optical arrangement which can be used according to the invention, FIG. 6 a third optical arrangement which can be used according to the invention, FIG. 7 the separation, according to the invention, of a substrate along narrow channels 1k between functional regions 1-1, 1-2 . . . of the substrate surface.

FIGS. 1 and 2 illustrate the basic procedure of the machining method according to the invention. A laser beam 2a emitted by the laser 3, not shown, is radiated onto the optical arrangement 6 (of this only the plano-convex collimation lens 11, which focuses the beam bundles of the laser beam 2a onto the substrate 1, is shown in FIG. 1c—cf. also the embodiments described in the subsequent FIGS. 4 to 6).

FIG. 1a shows (in plan view on the substrate plane or the x-y plane perpendicular to the direction of incident radiation z) what would happen without beam formation essential according to the invention by the subsequently also described elements 8, 7 and 13 of the optical arrangements according to the invention: from the radiated laser beam 2a, merely an expanded laser beam focal line would be produced, on the beam output side, over a defined expansion region along the beam direction (length direction 1 or incident radiation direction z). This is denoted here with the reference number 2b. The laser beam focal line 2b (the diameter of which can be defined in the substrate plane x-y, for example by the full width at half maximum intensity value in the beam cross-section) is surrounded, viewed perpendicular to the beam direction z or radially from the centre of the laser beam focal line 2b to the outside, by a region of reducing beam intensity which is subsequently termed halo region. The halo region, the radial expansion of which perpendicular to the beam direction z is provided here with the reference a, can be defined for example as that region in which the intensity in the laser beam 2a drops to one hundredth (or even e.g. to a thousandth) of the maximum intensity in the laser beam focal line 2b (or in the centre of the same). As is described more precisely with reference to FIG. 7, the residual intensity which is still present in the outer edge regions of the halo can lead, on functional surface regions of the substrate to be isolated, to undesired damage or destruction. One of the aims according to the invention is therefore the formation of a beam cross-section or of a halo shape in such a way that the mentioned damage or destruction can be prevented.

The beam formation effected for this purpose via elements 8, 7 and 13 which are essential to the invention (cf. FIGS. 4 to 6) is evident in FIGS. 1b and 1c: according to the invention, instead of a one-dimensional focal line 2b, a laser beam focal surface 2f which extends over a surface region is produced, which laser beam focal surface is expanded, viewed both along the beam direction z and viewed in precisely a first direction y, perpendicular to the beam direction z, however is not expanded in a second direction x which is both perpendicular to the first direction y and to the beam direction z (x, y, z=Cartesian coordinate system). Overlapping, at least in portions, this laser beam focal surface 2f of the laser radiation 2a, the planar substrate 1 to be machined is positioned in the beam path after the optical arrangement 6. The reference number 1a denotes the surface of the planar substrate orientated towards the optical arrangement 6 or the laser 3, the reference number 1b denotes the rear-side surface of the substrate 1 which is at a spacing and normally parallel hereto. The substrate thickness (perpendicular to surfaces 1a and 1b, i.e. measured to the substrate plane) is denoted with the reference d; cf. FIG. 2.

By means of the beam formation according to the invention, which is described subsequently in more detail, the previously circular halo region (FIG. 1a), viewed in cross-section in the substrate plane x-y, is reduced greatly in expansion in the second direction x (relative to the expansion perpendicular thereto and perpendicular to the beam direction z, i.e. relative to the expansion in the first direction y). In the centre of the halo region, instead of a rotationally-symmetrical focal line, a flattened focal surface is produced. The expansion of the halo region defined in the case of FIG. 1a in the x-direction is denoted with $a_x$, the expansion of the halo region in the y-direction with $a_y$. Advantageously, $a_x$ is smaller than $a_y$ by at least the factor 10, preferably by at least the factor 50, preferably by at least the factor 100.

As FIG. 2a shows, the substrate 1 here is orientated perpendicular to the beam longitudinal axis and hence to the focal surface 2f produced in the space by the optical arrangement of 6 behind the same (the substrate is perpendicular to the drawing plane) and, viewed along the beam direction z, is positioned relative to the focal surface 2f such that the focal surface 2*f*, viewed in beam direction z, begins in front of the surface 1*a* of the substrate and ends in front of the surface 1*b* of the substrate, i.e. still inside the substrate. The laser beam focal surface 2*f* which is expanded in both spatial directions z and y hence produces (in the case of suitable laser intensity in the region of the laser beam focal surface 2*f* which is ensured by focusing of the laser beam 2 on a portion of length l and of width b, i.e. by a surface focus of the surface 1·b) in the overlapping region of the focal surface 2*f* with the substrate 1, i.e. in the material of the substrate which is covered by the focal surface 2*f*, a surface portion 2*c* which is expanded viewed along the beam longitudinal direction z and over the width direction y via which an induced absorption in the material of the substrate is produced, which induces crack formations in the material of the substrate along the portion 2*c*. The crack formations are thereby effected not only locally but over the entire surface of the expanded portion 2*c* of the induced absorption. The length of this portion 2*c* (i.e. ultimately the length of the overlapping of the laser beam focal surface 2*b* with the substrate 1 in z-direction) is provided here with the reference L. The width of the portion 2*c* corresponds to the width b of the focal surface 2*f*. The average expansion of the portion of the induced absorption (or of the regions in the material of the substrate 1 which are subjected to crack formation) in the direction perpendicular to the surface expansion, i.e. viewed in x-direction, is denoted here with the reference D. This average expansion D corresponds to the average expansion of the laser beam focal surface 2*f* in x-direction.

As FIG. 2*a* shows, substrate material which is transparent at the wavelength λ of the laser beam 2*a* is hence heated according to the invention by induced absorption in the region of the focal surface 2*f*. FIG. 2*b* illustrates that the heated material ultimately expands so that a correspondingly induced stress leads to microcrack formation according to the invention, the stress being greatest at the surface 1*a*.

Subsequently, concrete optical arrangements 6 which can be used for the production of the focal surface 2*f* are described. All of the arrangements are thereby based on what has previously been described so that respectively identical references are used for components or features which are identical or correspond in their function. Subsequently, respectively only the differences are therefore described.

Since the separation surface leading ultimately to separation is or should, according to the invention, be of high quality (with respect to breaking resistance, geometric precision, roughness and avoidance of re-machining requirements), the individual (more precisely: produced by individual laser pulses) focal surfaces to be positioned along the separation line 5 (cf. FIG. 7) on the surface of the substrate are produced as described with the subsequent optical arrangements (the optical arrangement is subsequently also termed alternatively laser lens system). The roughness is thereby produced in particular from the expansion D of the focal surface in x-direction. In order to be able to achieve, at a given wavelength λ of the laser 3 (interaction with the material of the substrate 1), a small expansion D of for example 0.5 µm to 2 µm, in general specific requirements should be placed upon the numerical aperture of the laser lens system 6. These requirements are fulfilled by the subsequently described laser lens systems 6.

FIG. 3 shows, for all subsequently described optical arrangements 6, that the laser beam focal surface 2*f* can be positioned differently by suitable positioning and/or orientation of the optical arrangement 6 relative to the substrate 1 and also by suitable choice of the parameters of the optical arrangement 6; as the first line of FIG. 3 illustrates, the length l of the focal surface 2*f* can be adjusted such that it exceeds the substrate thickness d (here by the factor 2). If the substrate is hence placed, viewed in the beam direction z, centrally relative to the focal surface 2*f*, then an expanded portion of induced absorption 2*c* is produced over the entire substrate thickness d.

In the case shown in FIG. 3*b*, second line, a focal surface 2*f* of length l which corresponds approximately to the extension of the substrate d is produced. Since the substrate 1 is positioned relative to the surface 2*f* such that the surface 2*f* begins in a line in front of, i.e. outside the substrate, the length L of the expanded portion of induced absorption 2*c* (which extends here from the surface of the substrate up to a defined substrate depth, however not as far as the rear-side surface 1*b*) is smaller here than the length l of the focal surface 2*f*. The third line in FIG. 3*b* shows the case in which the substrate 1 is positioned, viewed along the beam direction z, partially before the beginning of the focal surface 2*f* so that, here also for the length l of the focal surface, l>L applies (L=expansion of the portion of induced absorption 2*c* in the substrate 1). The focal surface hence begins in the interior of the substrate and extends over the rear-side surface 1*b* until outside the substrate. The fourth line in FIG. 3*b* finally shows the case in which the produced focal surface length l is smaller than the substrate thickness d so that—with central positioning of the substrate relative to the focal surface, viewed in direction of incident radiation—the focal surface here begins close to the surface 1*a* in the interior of the substrate and ends close to the surface 1*b* in the interior of the substrate (l=0.75·d).

According to the invention, it is thereby particularly advantageous to produce the focal surface positioning such that at least one of the surfaces 1*a*, 1*b* is covered by the focal surface, the portion of induced absorption 2*c* begins hence at at least one surface. In this way, almost ideal cuts can be achieved by avoiding ablation, burr- and particle formation on the surface.

The optical arrangements shown in FIGS. 4 and 5 are based on the basic idea of using firstly a lens system (element 9) with a non-spherical free surface, in order to form the focal surface 2*f*, which free surface is shaped such that a focal surface of a defined length l is formed. For this purpose, aspheres can be used as optical elements 9 of the optical arrangement 6. For example in FIGS. 4 and 5, a so-called conical prism which is also often termed axicon is used. An axicon is a special, conically ground lens which forms a point source on a line along the optical axis (or also transforms a laser beam annularly). The construction of such an axicon is basically known to the person skilled in the art; the cone angle here is for example 10°. The axicon denoted here with the reference number 9 is orientated with its cone tip towards the direction of incident radiation (here: z-direction) and is centred on the beam centre. In the beam path after the free surface lens system, a further lens system is inserted (element 7 or 8) which reduces the expansion of the beam bundle of the laser radiation 2*a* in the second direction x, hence constricts the beam bundle in x-direction.

FIG. 4 shows a first example of a device according to the invention together with an optical arrangement 6 for forming a laser beam focal surface 2*f* which is expanded in the y-z plane (optical axis 6*z* of the arrangement 6 or of the device and direction of incident radiation in z-direction). In the beam path of the laser 3 (not shown), the laser beam of which is denoted with 2*a*, firstly an optical element with a non-spherical free surface which is formed to form a laser beam focal line expanded in the z-direction, viewed along the direction of incident radiation, is positioned. This optical element here is an axicon 9 with 5° cone angle which is positioned perpendicular to the beam direction and centred on the laser beam 2*a*. The cone tip of the axicon 9 thereby points towards the direction of incident radiation. In the beam direction at the spacing z1' from the axicon 9, a collimating optical element, here a plano-convex collimation lens 12, the planar surface of which points in beam direction z, is disposed such that the laser radiation incident on the plano-convex collimation lens 12 is collimated, i.e. orientated parallel. The spacing z1' of the plano-convex collimation lens 12 from the axicon 9 is chosen here with approx. 300 mm such that the laser beam bundle formed by the axicon 9 impinges annularly on the externally situated regions of the lens 12. Hence due to the lens 12 being at a radial spacing from the optical axis 6*z* of the device, an annular beam bundle 2*r* which extends parallel to the optical axis 6*z* is produced.

On the beam output side of the lens 12, a one-dimensional slit diaphragm 8 is positioned at the spacing z1 with z1>z1' (here: z1=1.3×z1'). The slit diaphragm 8 is orientated with its preferential direction (i.e. slit direction) in the first direction, i.e. the y-direction. The slit diaphragm (subsequently also termed alternatively slit diaphragm) 8 is thereby positioned such that the optical axis 6*z*, viewed in the second direction x, extends centrally between the two slit edges. The slit width is chosen such that it corresponds with the inner diameter 2*i* of the annular beam bundle 2*r* on the output side of the lens 12: as FIG. 4*a* shows, viewed along a straight line extending in x-direction and also through the optical axis 6*z*, the relevant components of the annular beam bundle 2*r* are occluded hence by the material of the edges of the slit diaphragm 8 which is not transparent for laser radiation of the used wavelength. Because of the one-dimensionality of the slit diaphragm 8, the relevant beam components in the beam bundle 2*r* reach the space however without being impeded on the output side of the slit diaphragm 8 (cf. FIG. 4*b*), viewed along a straight line extending in y-direction and through the optical axis 6*z*.

On the beam output side of the diaphragm 8 and at a spacing from the latter, a further plano-convex collimation lens 11, which serves here as focusing lens, is positioned centred about the optical axis 6*z*: said focusing lens focuses all of the beam components, not occluded by the diaphragm 8, of the previously annular beam bundle 2*r* into the first y and into the second x direction towards the planar substrate 1 which is disposed on the beam output side of this lens 11, perpendicular to the optical axis 6*z*, i.e. in the x-y plane. The lens 11 (the planar side of which is orientated towards the substrate 1) hence focuses the beam components, not occluded by the diaphragm 8, of the previously annular beam bundle 2*r* at a defined spacing from the lens 11 onto a two-dimensional laser beam focal surface 2*f* with a defined expansion in the z-direction (due to the effect of the axicon 9) and also with a defined expansion in the y-direction (due to the effect of the diaphragm 8); see in this respect the beam formation illustrated in FIG. 1*b*. The effective focal width of the lens 11 here is 25 mm so that the laser beam focal surface 2*f* is produced for instance at a spacing of 20 mm from the lens 11 (the substrate 1 is positioned there).

The optical properties of the optical arrangement 6 which comprises the rotationally-symmetrical elements 9, 12 and 11, positioned on the optical axis 6*z*, and also the diaphragm 8 (in particular the geometric forming of elements 9, 12, 8 and 11 and the positioning thereof relative to each other along the main beam axis 6*z*) can thereby be chosen such that the expansion 1 of the laser beam focal surface 2*f* in z-direction is twice as large as the thickness d of the substrate in z-direction. If the substrate is then positioned centred relative to the focal surface 2*f* (cf. FIG. 3, uppermost line), then formation of the expanded surface portion 2*c* of induced absorption is effected over the entire substrate thickness. The expansion 1 of the focal surface 2*f* in z-direction can be adjusted via the beam diameter on the axicon 9. The numerical aperture over the focal surface 2*f* can be adjusted via the spacing z1' of the axicon 9 from the lens 12 and also via the cone angle of the axicon 9. In this way, the entire laser energy can be concentrated in the focal surface 2*f*.

Instead of the plano-convex lenses 11, 12 shown in FIG. 4 (and also in FIGS. 5 and 6, see subsequently), also focusing meniscus lenses or other more highly corrected focusing lenses (aspheres, multilenses) can be used.

FIG. 5 shows a further example of a device according to the invention which is formed basically as the one shown in FIG. 4. Therefore, only the differences are subsequently described (the optical arrangement 6 comprises here the rotationally-symmetrical optical elements 9 and 11 centred on the axis 6*z* and also a cylindrical lens 7).

In the beam path 2*a*, the plano-convex, focusing cylindrical lens 7 is positioned on the beam output side of the axicon 9 instead of the lens 12 in FIG. 4, at a spacing of z2, viewed along the optical axis 6*z*. The spacing z2 of the lens 7 from the axicon can thereby be chosen as the spacing z1' in FIG. 4. The planar side of the cylindrical lens 7 which is positioned in the x-y plane lies on the side orientated away from the axicon 9. The preferential direction, i.e. the direction of the cylindrical axis of the cylindrical lens 7, is orientated parallel to the x-direction, and the cylindrical lens 7 is disposed centred, viewed with respect to the optical axis 6*z*. The spacing z2 and the expansions of the lens 7 are chosen such that the beam bundle, which is produced by the axicon 9 and diverges annularly on the input side of the cylindrical lens 7, impinges on the outer edge regions of the cylindrical lens 7. The shaping and positioning of the elements 9, 7 is thereby effected such that, viewed along a straight line extending in x-direction and through the optical axis 6*z*, the relevant beam components, impinging on the lens 7, of the annularly diverging beam bundle are not deflected (cf. FIG. 5*a*), whereas, viewed along a straight line extending in y-direction and through the optical axis 6*z*, the relevant beam components, impinging on the lens 7, of this beam bundle are collimated by the cylindrical lens 7, i.e. directed parallel (FIG. 5*b*).

At a defined spacing z2' behind the cylindrical lens 7, the focusing plano-convex collimation lens 11 is positioned in the beam path, centred about the optical axis 6*z*, as in the embodiment of FIG. 4. The spacing z2' is thereby chosen such that, viewed along the straight line extending in x-direction and through the optical axis 6*z*, the relevant beam components 2*x* pass by the lens 11 at the side without deflection, whereas, viewed along the straight line extending in y-direction and through the optical axis 6*z*, beam components 2*y* are intercepted completely by the lens 11, are deflected and the relevant ones are focused 2*f* on the substrate 1 positioned on the beam output side of the lens 11.

Also due to the combination of the rotationally-symmetrical axicon 9 with the cylindrical lens 7 and also the subsequent focusing by the rotationally-symmetrical plano-convex collimation lens 11, the beam formation from FIG. 1*b* can hence be produced. The expansion of the laser beam focal surface 2*f* in y-direction and in z-direction is thereby adjusted as follows:
- displacement spacing of workpiece 1 relative to focusing lens 11
- changing the focal length of the focusing lens 11
- illumination of axicon 9.

A further example of a device according to the invention for producing an expanded focal surface 2f is shown in FIG. 6.

In the beam path 2a of the laser 3 (not shown), firstly a non-rotationally-symmetrical optical element 13 provided with a preferential direction (here: x-direction) is positioned. This is configured as a planar element on the beam output side which deflects on the beam input side and is centred on the optical axis 6z. The planar side therefore points towards the substrate 1. The deflecting side situated opposite the planar side (i.e. pointing towards the laser 3) is configured as a pointed-roof-shaped double wedge, the central backbone of which extends along the x-direction and though the optical axis 6z. The element 13 is subsequently termed also double wedge for simplification.

As FIG. 6a shows, the relevant beam components of the beam bundle 2a, viewed along a straight line extending in x-direction and also through the optical axis 6z, is merely transmitted through the double wedge 13 but not deflected. Perpendicular thereto, i.e. viewed along a straight line extending in y-direction and through the optical axis 6z, the relevant partial beam bundles, situated on both sides of the optical axis 6z, are deflected by the double wedge structure towards each other, per se respectively parallel and also viewed as a whole (FIG. 6b): all of the beam components s1 of the beam bundle 2a radiated onto the double wedge 13, which are situated in the half space y1 above a plane extending parallel to the x-z plane and through the optical axis 6z, are hence deflected parallel and towards the oppositely situated half space y2 (extending below said plane parallel to the x-z plane and through the optical axis 6z). Conversely, all of the beam components s2 of the beam bundle 2a which are incident on the wedge 13 below said plane are deflected out of the half space y2 parallel and towards the half space y1.

Viewed in beam direction at a spacing from the wedge 13 (behind the intersection point of the two beam components s1 and s2), a cylindrical lens 7 is positioned, as in the example of FIG. 5: viewed in x-direction, no deflection of the beam components s1 and s2 is undertaken by said cylindrical lens and, viewed in y-direction, the two beam components s1 and s2 are deflected by the latter towards the axis 6z and collimated (both beam components s1 and s2 extend on the beam output side of the lens 7 parallel to the axis 6z).

Viewed in beam direction, the plano-convex collimation lens 11 is positioned behind the cylindrical lens 7 i.e. at a defined spacing z3 on the beam output side of the double wedge 13 (as in the examples from FIGS. 4 and 5). Said lens is likewise configured as described in the previous examples and is disposed centred on the axis 6z. The spacing z3 is chosen such that the two beam bundles s1 and s2 which diverge, viewed in the direction of incident radiation (z-direction) parallel away from each other and directed parallel after the lens 7, impinge, viewed in y-direction, on externally situated edge regions of the collimation lens 11. The lens 11 hence focuses the two beam bundles s1 and s2 on a laser beam focal surface 2f expanded in the y-z plane, in which, as described in the other embodiments, the substrate 1 to be machined is positioned. Also with an optical arrangement 6 comprising the elements 11, 7 and 13, the beam formation according to FIG. 1b can hence be produced.

FIG. 7 illustrates, in plan view on the substrate plane (x-y plane), a possible machining according to the invention of a semiconductor substrate 1 already provided with functional structures 1-1, 1-2, 1-3 and 1-4. The functional structures 1-1, . . . disposed here in quadrant form must not be subjected to any laser irradiation during isolation (the halo region H of the laser beam shown in FIGS. 1a and 1b and indicated with the references a or $a_x$, $a_y$ must hence also be prevented in particular from covering the mentioned functional regions during isolation). Laser radiation must be effected hence exclusively on the channel-shaped structures 1k which extend between the functional regions and have no functional structures at all and therefore may be laser-irradiated.

As FIG. 7 indicates, the operation can take place with a laser beam focal surface 2f produced according to FIG. 1b and adapted to the width of the channels 1: the feed direction of the laser beam 2a over the substrate 1 is set precisely parallel to a channel longitudinal axis (here: of the vertically extending channel 1k orientated in y-direction). At the same time, the laser beam focal surface 2f is produced perpendicular to the substrate plane (x-y plane) and parallel to the feed direction. Hence, for example in the case shown in FIG. 4 (the deflection lens system which is known per se to the person skilled in the art, and for example producible on the basis of galvanometer scanners is not shown in the embodiments of FIGS. 4 to 7), a feed of the laser beam 2a is effected along a line 5 (which corresponds to a desired separation line, along which the substrate is intended to be separated) such that a large number 2c-1, 2c-2, . . . of expanded surface portions 2c of induced absorption (cf. FIG. 3) is produced. Each portion of induced absorption 2c-1, . . . thereby corresponds to a defect zone produced by a single laser pulse of the pulsed laser in the substrate material along the separation line 5. Since the individual defect zones 2c-1, . . . are produced in the centre of the channel 1k and these or the laser beam focal surfaces 2f extend respectively parallel to the edges of the functional structures 1-1, . . . , it can be ensured by suitable choice of the optical parameters that the halo zone H surrounding the focal surface 2f in x-direction has a substantially smaller diameter than in y-direction. The expansion of the halo zone H in x-direction is thereby chosen such that it is smaller than the channel width of the channel 1k.

The repetition rate of the laser pulses is coordinated to the feed speed of the laser such that the average spacing A of immediately adjacent expanded surface portions 2c of induced absorption, i.e. produced by temporally directly successive laser pulses, is slightly (e.g. by the factor larger than the width b of the laser beam focal surface 2f in feed direction or y-direction. Hence, without intensity overlapping, introduction of a large number of defect structures 2c which are placed immediately in a row along the channel axis 1k or the desired separation line 5 is effected and hence efficient separation of the substrate 1 along such channels 1k. The substrate residues which still remain between two adjacent defect structures 2c and are detectable here as gaps can readily effect crack formations due to the effect of mechanical forces and/or thermal stresses in order to separate finally from each other the substrate fragments produced on both sides of the separation line 5.

The invention claimed is:

1. A method for laser-based machining of a planar, crystalline substrate to separate the substrate into a plurality of parts, the method comprising:
for machining the substrate, directing a laser beam of a laser onto the substrate with an optical arrangement positioned in the beam path of the laser beam to form on a beam output side of the optical arrangement a laser beam focal surface expanded both along the beam direction and in a first direction perpendicular to the beam direction, but which is not expanded in a second direction that is both perpendicular to the first direction and to the beam direction; and locating the substrate such that the laser beam focal surface produces, in an interior of the substrate, an induced absorption which induces crack formations in the substrate material forming an expanded surface portion in the substrate having a width corresponding to a width of the expanded beam focal surface in the first direction, wherein the induced absorption is produced such that the crack formations in the substrate material are effected without ablation and without melting of the material of the substrate, wherein the machining is conducted by using a conical prism or axicon as an optical element of the optical arrangement, which optical element has a non-spherical free surface that is formed to form the laser beam focal surface with a defined length and expansion extending in the beam direction, and wherein said machining is conducted by positioning a diaphragm which cuts an expansion of the laser beam in the second direction and which is oriented with a long direction thereof extending in the first direction, on the beam output side of and spaced from the optical element with the non-spherical free surface.

2. The method of claim 1, wherein the planar, crystalline substrate is one of:
a semiconductor substrate;
an insulator substrate; or
a substrate comprising of at least one carbon-based material with crystalline or quasi-crystalline basic order.

3. The method of claim 1, wherein the expansion of the laser beam focal surface in the first direction is larger by at least 5 times than a dimension of the laser beam focal surface in the second direction.

4. The method of claim 1, wherein the substrate is positioned relative to the laser beam focal surface such that, viewed in the beam direction, the expanded surface portion of the substrate material extends up to at least one of two oppositely situated substrate surfaces.

5. The method of claim 1, wherein the substrate is positioned relative to the laser beam focal surface such that, viewed in the beam direction, the expanded surface portion of the substrate material, in the interior of the substrate starting from one of two oppositely situated substrate surfaces, extends into the substrate but not up to the other of the two oppositely situated substrate surfaces, so as not to extend over the entire thickness of the substrate.

6. The method of claim 1, wherein a pulsed laser is used as the laser.

7. The method of claim 1, wherein the laser beam is moved, relative to the surface of the substrate, along a line along which the substrate is to be separated in order to obtain a plurality of expanded surface portions of induced absorption in the interior of the substrate produced along the line.

8. The method of claim 1, wherein during or after production of the expanded surface portion of induced absorption in the interior of the substrate, mechanical forces or thermal stresses are exerted on the substrate in which the substrate is heated non-uniformly and cooled in order to effect, respectively between directly adjacent expanded surface portions of the substrate material, a crack formation in order to separate the substrate into the plurality of parts.

9. A method for laser-based machining of a planar, crystalline substrate in order to separate the substrate into a plurality of parts, the method comprising:

for machining the substrate, directing a laser beam of a laser onto the substrate;

positioning an optical arrangement in the beam path of the laser to form on a beam output side of the optical arrangement a laser beam focal surface expanded both along the beam direction and in a first direction perpendicular to the beam direction, but which is not expanded in a second direction that is both perpendicular to the first direction and to the beam direction; and positioning the substrate such that the laser beam focal surface produces, in the interior of the substrate, an induced absorption which induces crack formations in the substrate material forming an expanded surface portion in the substrate having a width corresponding to a width of the expanded beam focal surface in the first direction, wherein the induced absorption is produced such that the crack formations in the substrate material are effected without ablation and without melting of the material of the substrate, wherein the machining is conducted by using a conical prism or axicon as a first optical element of the optical arrangement, which optical element has a non-spherical free surface that is formed to form the laser beam focal surface with a defined length and expansion extending in the beam direction, and wherein said machining is conducted by positioning a second optical element, which focuses the laser beam in the first direction, but not in the second direction, on the beam output side of and spaced from the first optical element with the non-spherical free surface.

10. A method for laser-based machining of a planar, crystalline substrate in order to separate the substrate into a plurality of parts, the method comprising:

for machining the substrate, directing a laser beam of a laser onto the substrate;

positioning an optical arrangement in the beam path of the laser beam to form on a beam output side of the optical arrangement a laser beam focal surface expanded both along the beam direction and in a first direction perpendicular to the beam direction, but which is not expanded in a second direction that is both perpendicular to the first direction and to the beam direction; and positioning the substrate such that the laser beam focal surface produces, in the interior of the substrate, an induced absorption which induces crack formations in the substrate material forming an expanded surface portion in the substrate having a width corresponding to a width of the expanded beam focal surface in the first direction, wherein the induced absorption is produced such that the crack formations in the substrate material are effected without ablation and without melting of the material of the substrate, and wherein the machining is conducted by using a double wedge as a first optical element of the optical arrangement by which bundles of the beam are deflected from two respective half spaces, which half spaces are situated, viewed in the first direction, oppositely relative to the optical axis of the optical arrangement, with beam components of each of the deflected bundles extending parallel to one another with the deflected bundles running towards the optical axis, and by positioning a second optical element, which focuses the laser beam at least in the first direction, on the beam output side of and spaced from the first optical element.

11. The method of claim 10 wherein at least one of:

a pulse duration of the laser is chosen such that, within the interaction time with the material of the substrate, the heat diffusion in the substrate material is negligible;

a pulse repetition frequency of the laser is between 10 kHz and 1,000 kHz;

the laser is operated as a single pulse laser or as a burst pulse laser; and the average laser power, measured directly on the beam output side of the laser, is between 5 watts and 100 watts.

* * * * *